UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

DEMOUNTABLE WHEEL.

1,414,374.  Specification of Letters Patent.  Patented May 2, 1922.

Application filed October 31, 1919. Serial No. 334,694.

*To all whom it may concern:*

Be it known that I, ALDEN L. PUTNAM, a citizen of the United States of America, residing at Detroit, in the county of Wayne and State of Michigan, have invented certain new and useful Improvements in Demountable Wheels, of which the following is a specification, reference being had therein to the accompanying drawings.

The invention relates to demountable wheels of the disk type and has particular reference to a construction of means for quickly mounting and demounting the disk.

Figure 1:
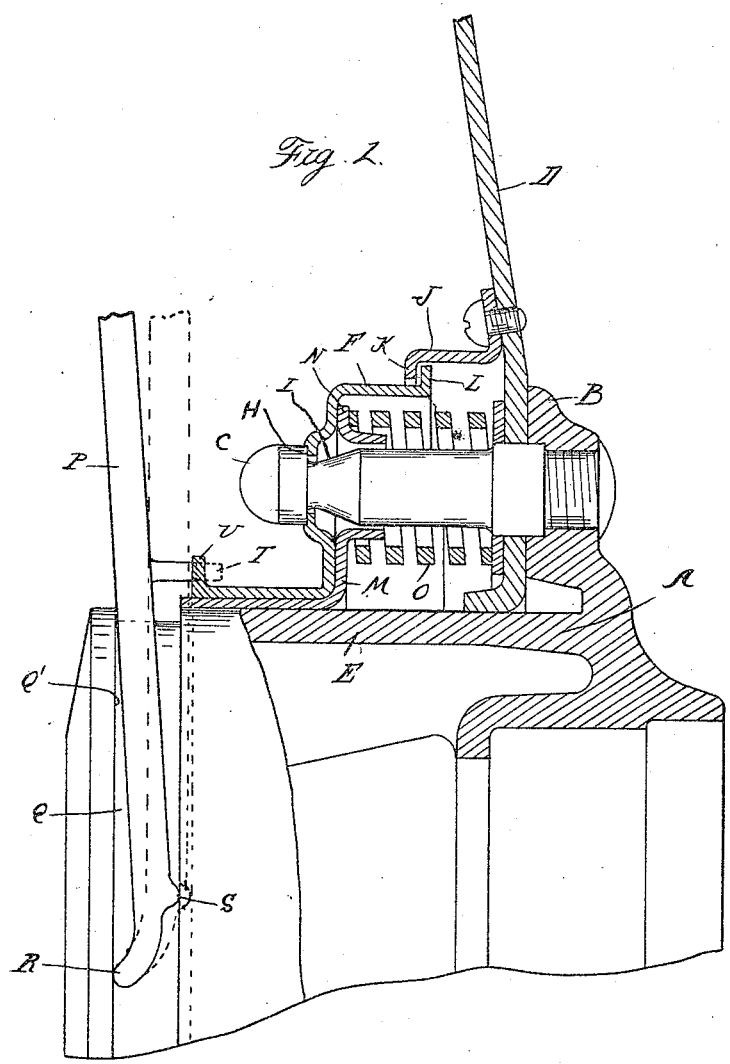
Figure 1 is a section through a wheel.
Figure 2:
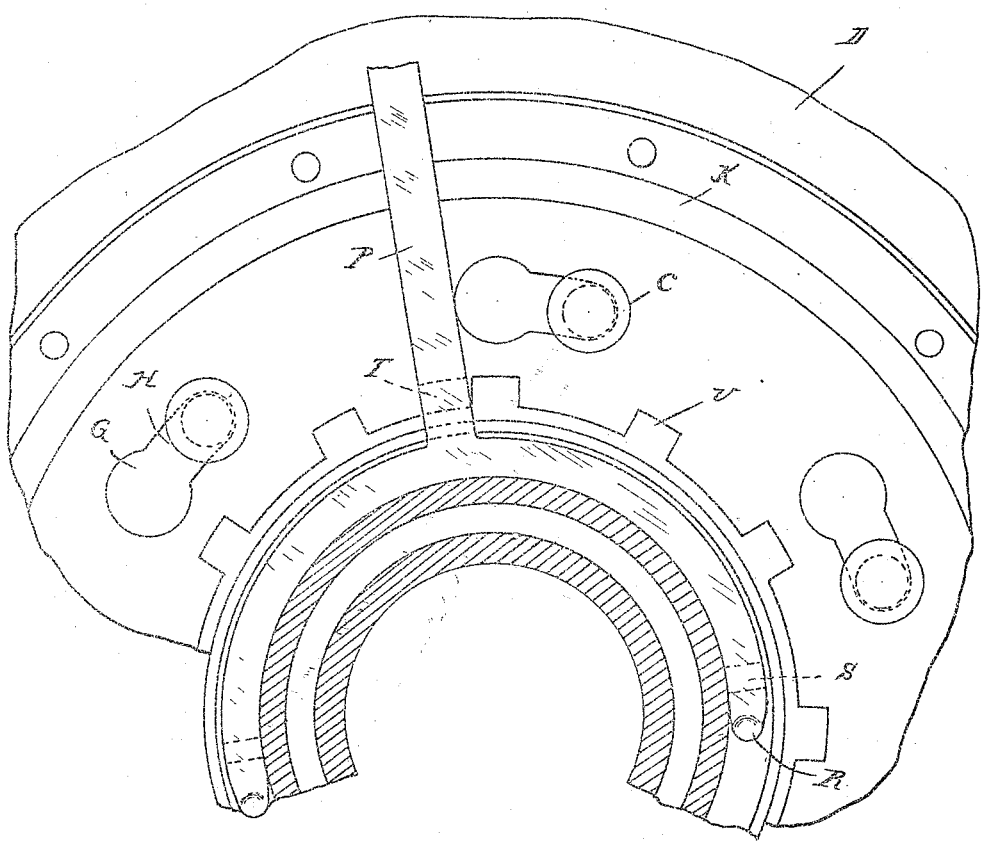
Figure 2 is an end elevation.

A is the hub of the wheel; B is a radially extending flange on the hub; C are studs arranged around and secured to the flange B and projecting forward therefrom. D is the disk wheel which is centrally apertured to engage the cylindrical portion E of the hub.

It is one of the objects of the invention to provide the disk with means permanently mounted thereon for effecting a locking engagement with the studs C so as to clamp the disk against the flange B. This, as shown, comprises an annular clamping member F which surrounds the cylindrical portion E of the hub and which is apertured in registration with the several studs C as indicated at G. Each of the apertures G is further provided with a laterally extending slot H of smaller diameter and the studs C are grooved at I to engage said slots when the member F is slightly rotated. The member F is secured to the disk D by an annular member J which has an inwardly-extending flange K for engaging an outwardly extending flange L on the member F. M is an annular member arranged inside of the member F and having a series of apertured seats N which register with the apertures G. O are springs engaging the seats N and bearing at their opposite ends against the disk D.

With the construction as thus far described the tension of the springs O will press the member M and the contacting member F outward until the engaging flanges K and L will prevent further movement. In this position the disk, together with the members F, J and M and the springs O, can be placed upon the hub, the studs C passing through the springs O and registering apertures in the members M and F. If the member F is then pressed inward so as to compress all of the springs O and is then slightly revolved, the reduced portion of the studs formed by the grooves I may be entered into the slots H and when the tension is released, the springs will press the member F outward against the shoulders on said studs engaging the heads of the studs in shallow recesses H in the outer face of the member F and thereby locking said member in its position retaining the disk against removal. Also the tension of the springs is sufficient to hold the disk against the flange B. It is, however, necessary to exert considerable pressure to overcome the resistance of the springs O and while this pressure is maintained to rotate the member F. This may be accomplished by a tool P which is bifurcated to embrace the hub engaging a groove Q therein. The member P is further provided with bearings R which rest against the flange Q' formed by the groove Q, and further with the inner bearings S for engaging the outer end of the member M which projects beyond the groove Q. Still further, the member P is provided with a lug T which is engageable with lugs U on the member F. Thus, in operation, by engaging the member P with the hub and then pressing inward on said member, the member M is first forced inward, compressing the springs O and permitting the member F to also move inward so that the slots H are in the plane of the grooves I. Then by slightly rotating the member P about the axis of the hub, the engagement between the lugs T and U will rotate the member F engaging the slots H with the grooves I. The member P may then be detached, permitting the pressure of the springs O to force the members outward, but the locking is effected by the engagement of the shoulders upon the studs with the sides of the slots H. To detach the wheel the tool is engaged in the same manner and pressed inward to compress the springs after which it is rotated in a reverse direction from that used in locking the parts.

What I claim as my invention is:

1. The combination with a hub, a disk for mounting thereon, of a stud projecting from said hub and engageable with a registering aperture in said disk, a spring permanently secured on said disk and surrounding the aperture for said stud, a member adjustably secured to said disk having an aperture which in one position of adjustment registers with said disk aperture and having a connecting slot of smaller diameter, and an undercut shoulder on said stud for engaging with the slotted portion of said member in another position of rotative adjustment and when said rotatively adjustable member is under the tension of said spring.

2. The combinataion with a hub and a disk for mounting thereon, of studs projecting from said hub and engaging registering apertures in said disk, a locking member permanently carried by said disk and having a rotative adjustment thereon, said member being engageable with said studs in one position of adjustment and having a locking engagement therewith in another position of rotative adjustment, and spring means carried by the disk stressing said locking member outwardly from the disk.

3. The combination with a hub, a disk for mounting thereon, a stud projecting from said hub and engageable with a registering aperture in said disk, said stud having an undercut shoulder, a spring permanently carried by the disk and surrounding the aperture for said stud, a locking member adjustably secured to said disk and urged by said spring from the disk, said member being adjustable toward the disk in opposition to said spring and subsequently rotatively adjustable to engage with the shoulder of said stud, and having a portion adapted for locking engagement with said shoulder of the stud under stress of said spring through rotative adjustment of said locking member.

4. The combination with a hub and a disk demountably engaging said hub, of a locking member permanently carried by the disk and rotatively adjustable thereupon, a plurality of members carried by the hub engageable by said locking member through rotation of the latter to retain the disk upon the hub, and spring means carried by the disk stressing the locking member outwardly from the disk.

5. The combination with a hub and a disk demountably engaging said hub, of a locking member carried by the disk and rotative about the axis thereof, a plurality of members carried by the hub and engageable by said locking member through rotation of the latter to retain the disk upon the hub, spring means compressed between the disk and said rotative member stressing the latter to resist rotative movement of the same from its locking position, and means carried by the hub limiting upward movement of the locking member from the disk when said member is shifted from locking position.

In testimony whereof I affix my signature.

ALDEN L. PUTNAM.